Sept. 19, 1961  B. DUBSKY ET AL  3,000,214
ELECTROMAGNETIC THERMOMETER
Filed Oct. 9, 1957
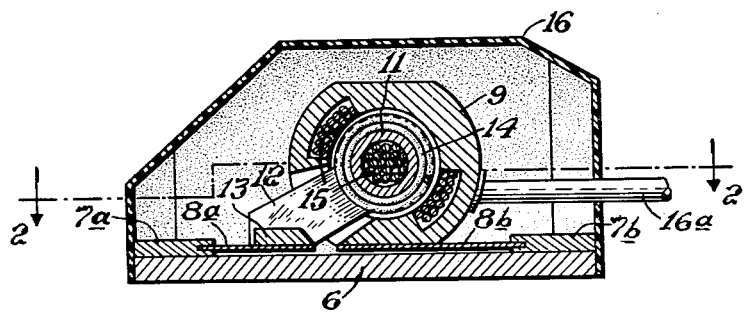
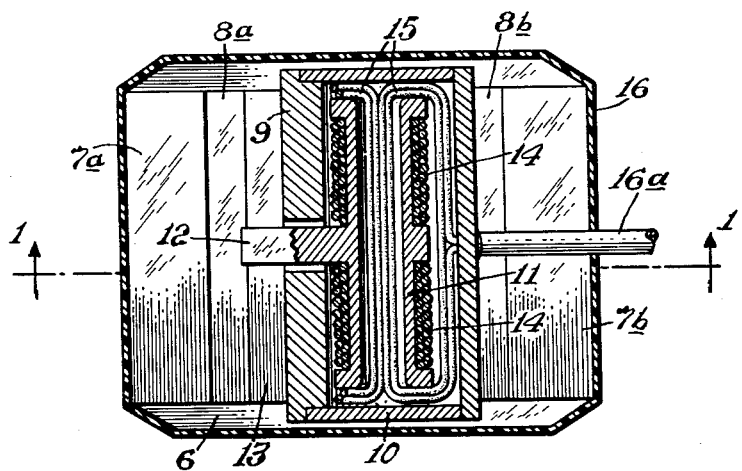
INVENTORS.
Bořivoj Dubský
BY Oldřich Straka _United States Patent Office_ 3,000,214
Patented Sept. 19, 1961

3,000,214
ELECTROMAGNETIC THERMOMETER
Bořivoj Dubský and Oldřich Straka, Prague, Czechoslovakia, assignors to Vzkumny a zkusebni letecky ustav, Letnany, Czechoslovakia
Filed Oct. 9, 1957, Ser. No. 689,177
Claims priority, application Czechoslovakia Oct. 11, 1956
1 Claim. (Cl. 73—362)

The present invention relates to an electromagnetic thermometer, which utilizes the magnetostrictive properties of ferromagnetic materials.

There are many types of thermometers which are based on various physical phenomena according to the intended use. The present invention resembles most a resistance thermometer. The latter thermometer, although simple, must be used with an exact measuring apparatus or special instruments (for example, cross winding instruments), and the measuring operation is inconvenient, particularly when bridge measuring methods are employed. Otherwise resistance thermometers have the advantage of being suitable for a wide range of temperatures.

The electromagnetic thermometer according to the present invention comprises means by which the relative displacement of two different materials, caused by a temperature change, is transformed into a twist of a ferromagnetic rod, said twist deforming a magnetic field produced by an exciting circuit so that the deformed field induces an electromotive force in a pick-up circuit, which is proportional to the displacement and also proportional to the temperature.

The electromagnetic thermometer embodying the invention is advantageous in that it employs a simple exciting and pick-up device for obtaining the electromotive force proportional to the temperature without any intermediate stages, which are the source of inaccuracies. The measuring of the induced electromotive force as a function of the temperature is very simply effected, and the apparatus therefor consists of the usual instruments connected in a simple way.

The above, and other objects, features and advantages of the invention, will be apparent in the following detailed description of a preferred embodiment thereof which is to be read in connection with the accompanying drawing, forming a part hereof and wherein:

FIG. 1 is a vertical sectional view of an electromagnetic thermometer embodying the invention and taken along the line 1—1 of FIG. 2; and FIG. 2 is a horizontal sectional view taken along the line 2—2 of FIG. 1.

The electromagnetic thermometer embodying the present invention substantially comprises four components, namely, a transmission member which is dimensionally altered by the temperature to be measured, a torsional body which is twisted in response to the dimensional changes in the transmission member, an exciting member for magnetizing the torsional body and a pick-up member in which an electromotive force is induced in response to deformation of the magnetic field upon twisting of the torsional body.

Referring to FIGS. 1 and 2 in detail, it will be seen that the electromagnetic thermometer constructed in accordance with a preferred embodiment of the invention comprises a base 6 having two flat members 7a and 7b secured to a surface thereof at spaced apart locations, and strips 8a and 8b extending from members 7a and 7b, respectively, toward each other in a plane parallel to that of the base 6. The strip 8b is tangentially secured to a cylindrical casing 9 which contains a coaxial tubular torsional body 11 having its ends rigidly secured to the adjacent end walls 10 of the casing 9. The torsional body 11 is secured to the other strip 8a by means of a radially directed arm 12 extending from the middle of body 11 and having a laterally extending bar 13 at its free end joined to strip 8a.

Two series connected coils 14 which may be connected to the exciting circuit (not shown) surround the torsional body 11 between arm 12 and the opposite ends of the torsional body, and a toroidal pick-up coil 15 extends axially around body 11 in suitable recesses provided in the internal surface of casing 9 and through an axial bore in the body 11.

The entire electromagnetic thermometer, with the exception of the base 6, is contained within a thermally insulating cover 16, and the electrical conductors leading from the coils 14 to the source of excitation current and from the coil 15 to the pick-up circuit are led into the electromagnetic thermometer through a conduit 16a.

The temperature to be measured acts on the base 6, either by convection or radiation, and the base 6 is formed of a material having a thermal coefficient of expansion and contraction which is different from that of the strips 8a and 8b. Thus, in response to a change in the temperature acting on the base 6, the members 7a and 7b are displaced toward or away from each other by distances differing from the expansion or contraction of the strips 8a and 8b which are connected to the torsional body 11 and the casing 9, respectively, whereby torsional bending and shearing stresses are produced in torsional body 11. By way of example, and assuming that the base 6 expands a greater distance than the strips 8a and 8b in response to an increase in temperature, then it will be apparent that the strip 8a will pull arm 12 to the left, as viewed in FIG. 1, thereby tending to turn torsional body 11 in the clockwise direction, while the strip 8b will pull towards the right and tend to turn casing 9 in the counterclockwise direction.

The exciting current flowing through the coils 14 generates a longitudinal electromagnetic field in the torsional body 11, and that field is deformed by the torsional stress acting on body 11, as previously indicated, so as to produce a component in the circumferential direction which is proportional to the magnitude of the torsional stress, and thus also proportional to the temperature acting on the base 6. The circumferentially directed component of the electromagnetic field induces an electromotive force in the toroidal pick-up coil 15 which is proportional to the temperature acting on base 6.

Although the above description o fthe preferred embodiment of the invention has referred to the coils 14 as the exciting coils, and to the coil 15 as the pick-up coil, it will be apparent that the connections of such coils may be reversed, that is, coil 15 may be connected to the exciting circuit so as to produce a normally circular magnetic field in the body 11, while the coils 14 are connected to the pick-up circuit and have an electromotive force induced therein proportional to the temperature acting on the base 6 when the body 11 is torsionally stressed so as to deform the normally circular magnetic field and thereby produce a component of the field in the longitudinal or axial direction.

By a suitable choice of material for the winding of the coils and the insulation thereof measurement is made possible within a very extended range of temperatures. It is a great advantage of the invention that the obtained electromotive force is considerable and that therefore the instruments used may be of the usual design, to effect a reduction of cost and extended scope of use of the thermometers even where remote measuring and registering of temperature has not been feasible up to now. The entire apparatus is simple and does not require the use of electronic components.

We claim:
An electromagnetic thermometer comprising a ferro- magnetic torsional body, means for magnetizing said body, pick-up coil means on said body and adapted to have an electromotive force induced therein in response to the deformation of the magnetization of the torsional body by torsional stressing of the latter, a base exposed to the temperature to be measured for expansion and contraction in response to changes in said temperature, a cylindrical casing having said torsional body therein and being rigidly secured to the latter at its opposite ends, first and second strips secured to said base at spaced apart locations and extending generally parallel to the latter to move toward and away from each other in response to expansion and contraction of said base, said first strip being tangentially connected to said cylindrical casing, and an arm extending radially from the middle of said torsional body and being connected to said second strip, said strips and base having different thermal coefficients of expansion so that said arm and casing are turned relative to each other to torsionally stress said body in response to changes in the temperature acting on said base, whereby the electromotive force induced in said pick-up coil means is proportional to the temperature.

References Cited in the file of this patent

UNITED STATES PATENTS

| | | |
|---|---|---|
| 637,343 | Von Koehring | Nov. 21, 1899 |
| 973,963 | Ozias | Oct. 25, 1910 |
| 1,566,347 | Shaw | Dec. 22, 1925 |
| 2,152,934 | Trent | Apr. 4, 1939 |
| 2,260,036 | Kuehni | Oct. 21, 1941 |
| 2,293,502 | Hermann | Aug. 18, 1942 |
| 2,480,433 | Amsler | Aug. 30, 1949 |
| 2,511,178 | Roters | June 13, 1950 |